(12) United States Patent
Nishigaya et al.

(10) Patent No.: US 6,685,090 B2
(45) Date of Patent: Feb. 3, 2004

(54) APPARATUS AND METHOD FOR MULTI-PROFILE MANAGING AND RECORDING MEDIUM STORING MULTI-PROFILE MANAGING PROGRAM

(75) Inventors: Takashi Nishigaya, Kawasaki (JP); Shigeki Fukuta, Kawasaki (JP); Yuji Takada, Chiba (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/769,379

(22) Filed: Jan. 26, 2001

(65) Prior Publication Data

US 2001/0048026 A1 Dec. 6, 2001

(30) Foreign Application Priority Data

May 24, 2000 (JP) ........................................ 2000-152367

(51) Int. Cl.[7] ................................................. G06K 5/00
(52) U.S. Cl. ..................... 235/382; 235/382.5; 235/376; 235/487
(58) Field of Search .............................. 235/382, 382.5; 705/10; 707/2, 3, 4; 709/213, 219, 221

(56) References Cited

U.S. PATENT DOCUMENTS

| | | | | |
|---|---|---|---|---|
| 5,870,733 A | * | 2/1999 | Bass et al. ...................... | 707/2 |
| 5,918,227 A | * | 6/1999 | Polnerow et al. ............. | 707/10 |
| 6,012,088 A | * | 1/2000 | Li et al. ...................... | 709/219 |
| 6,044,465 A | * | 3/2000 | Dutcher et al. ............. | 713/200 |
| 6,073,105 A | * | 6/2000 | Sutcliffe et al. ................ | 705/1 |
| 6,097,719 A | * | 8/2000 | Benash et al. ............... | 370/532 |
| 6,115,709 A | * | 9/2000 | Gilmour et al. ................ | 707/9 |
| 6,151,584 A | * | 11/2000 | Papierniak et al. ........... | 705/10 |
| 6,185,689 B1 | * | 2/2001 | Todd, Sr. et al. ........... | 713/201 |
| 6,208,975 B1 | * | 3/2001 | Bull et al. ..................... | 705/14 |
| 6,275,825 B1 | * | 8/2001 | Kobayashi et al. ............ | 707/9 |
| 6,343,287 B1 | * | 1/2002 | Kumar et al. .................. | 707/4 |
| 6,366,954 B1 | * | 4/2002 | Traversat et al. ........... | 709/220 |
| 6,434,619 B1 | * | 8/2002 | Lim et al. ................... | 709/229 |
| 6,446,071 B1 | * | 9/2002 | Callaway et al. ............. | 707/10 |
| 6,470,332 B1 | * | 10/2002 | Weschler ....................... | 707/3 |

* cited by examiner

Primary Examiner—Michael G. Lee
Assistant Examiner—Ahshik Kim
(74) Attorney, Agent, or Firm—Staas & Halsey LLP

(57) ABSTRACT

A multi-profile managing apparatus for unifying a plurality of profilers includes an unified access unit, a name managing unit, and a profile access unit. The unified access unit accepts an access request to a profiler from any of services in accordance with an access protocol determined for the service, via an unified access interface corresponding to the protocol. The name managing unit converts a data element name designated in the access request to information in relation to a real storage location within the profiler. The profile access unit accesses the profiler on the basis of the information in relation to the storage location obtained through the conversion, via a corresponding profile access interface.

17 Claims, 8 Drawing Sheets

APPARATUS AND METHOD FOR MULTI-PROFILE MANAGING AND RECORDING MEDIUM STORING MULTI-PROFILE MANAGING PROGRAM

CROSS REFERENCE TO RELATED APPLICATION

The contents of Japanese Patent Application No. 152367/2000, filed May 24, 2000 in Japan, is incorporated herein by reference.

BACKGROUND OF THE INVENTION

1. Field of the Invention

The present invention relates to a multi-profile managing apparatus, and more particularly to a multi-profile managing apparatus which is used in conjunction with a plurality of computers connected via a network and is adapted to unify a plurality of profilers which differ from one another in terms of access protocol and data expression scheme.

2. Description of the Related Art

The term "profiler" means a data storage device or data storage program for storing service setting data and personal data which are necessary for providing services through a network to users who wish to receive the services by use of, for example, information terminals connected to the network in such a manner that each user is provided with customized service. The data storage device or data storage program is referred to in order to provide such customized service. The present invention encompasses cases in which a plurality of services and a plurality of profilers are present on a single user's terminal, and the plurality of services are provided to the user.

Conventionally, when a service providing program provides each user with customized service which is suited to the user's preference, as shown in FIG. 9, different profilers 1, 2, . . . , n are prepared for respective services 1, 2, . . . , n; and each profiler 1, 2, . . . , n manages setting data of the corresponding service. The relationship between a service and the profiler used by the service corresponds to the relationship between an application program which operates on a computer and an initial setting file therefor.

In general, each user selectively uses a plurality of services in accordance with intended purpose, and among them, an increasing number of services (in particular, network services) are standardized in terms of setting data required to receive services. Further, in an increasing number of cases, for different services, information elements which are partially common among the services are used as setting data. Examples of information elements which are used in common among different applications include a mail address and phone number of a user; addresses of various servers such as a web proxy, a mail server, and a news server; a web bookmark; and an address book.

Conventionally, profilers which store setting data for respective services are provided independent of one another. Therefore, whenever a user wishes to start use of a new service, the user must input setting data. Further, when the user wishes to change setting data which are used in common among a plurality of services, the corresponding information elements in profilers used by the plurality of services must be changed individually.

SUMMARY OF THE INVENTION

An object of the present invention is to unify a plurality of profilers provided independently for a plurality of services and to unify an interface of access protocols and data expression schemes, while minimizing influence on existing services and profilers, to thereby reduce the burdens imposed on users and service providers in relation to management of service setting data and personal data.

Another object of the present invention is to provide a multi-profile managing apparatus as aforementioned.

Still another object of the present invention is to provide a method for multi-profile managing as aforementioned.

A further object of the present invention is to provide a program recording medium recording a program to realize a multi-profile managing apparatus as aforementioned.

Still a further object of the present invention is to provide a computer system which enables access from a plurality of service to a plurality of profilers.

Another object of the present invention is to provide a method which enables access from a plurality of service to a plurality of profilers.

A multi-profile managing apparatus of the present invention is connected a plurality of profilers which are different type from one another, and comprises: a unified access unit accepting an access request to any of the plurality of profiler according to an access protocol determined for each of a plurality of service; a name managing unit converting a data element name designated in the access request to information indicating a real storage location within the profiler; and a profile access unit accessing the profiler on the basis of the information indicating the real storage location obtained by the name managing unit.

A method for multi-profile managing of the present invention manages a plurality of profilers which are a different type from one another, and comprises: accepting an access request to a profiler from any of services by a unified access interface corresponding to an access protocol determined for the service; converting a data element name designated in the access request to information indicating a real storage location within the profiler on the basis of data-element correspondence data registered in advance; and accessing the correspondence profiler on the basis of the information indicating the real storage location obtained through the conversion, by use of an profile access interface corresponding to the access protocol to the profiler.

A program recording medium of the present invention recording a program which realizes a multi-profile managing apparatus, and causes a computer to perform: processing to accept an access request to a profiler from any of services in accordance with an access protocol determined for the service; processing to convert a data element name designated in the access request to information indicating a real storage location within the profiler; and processing to access the profiler on the basis of the information indicating the real storage location.

A computer system of the present invention comprises: a plurality of profilers which are a different type from one another; a plurality of services; and a multi-profile managing apparatus being provided between the plurality of profilers and the plurality of services. And, in the system, the multi-profile managing apparatus comprises as aforementioned.

A method of the present invention for accessing from a plurality of services to a plurality of profilers comprises: generating an access request to one of the plurality of profilers; converting a data element name designated in the access request to information indicating a real storage location within the profiler on the basis of data-element correspondence data registered in advance, the access request being accepted by a unified access interface corresponding to an access protocol determined for the service; and accessing the corresponding profiler on the basis of the information indicating the real storage location obtained through the conversion, by use of an profile access interface corresponding to the access protocol to the profiler.

These, together with other objects and advantages which will be subsequently apparent, reside in the details of construction and operation as more fully described and claimed hereinafter, with reference to the accompanying drawings, wherein like numerals refer to like parts throughout.

DESCRIPTION OF THE PREFERRED EMBODIMENT

According to the present invention, a multi-profile management apparatus for managing a plurality of profiles is provided between existing services and profilers therefor, such that when viewed from any server which utilizes a multi-profile management function, the multi-profile management apparatus is viewed as a single virtual profiler in which profilers having different access means are unified.

That is, the present invention provides a single virtual profiler (unified profiler) through integration of existing profilers. This enables each service to access setting data and personal data by use of the same protocol and data element names as those used in a dedicated profiler. In addition, each service can access, by use of a protocol dedicated for the service, setting data and personal data used by other services. Therefore, burdens which are imposed on users and service providers at time of expansion of the functions of the services can be reduced.

Moreover, since existing profilers are present in a unified state, when a user wants to change setting data or personal data which are used in common among different services, the user is required to change the contents of the virtual, unified profiler only once. In the present specification, the term "virtual, unified profiler" means profilers accompanied by access means which enables a plurality of physically existing profilers to be viewed as a unified, single profiler by any one of the servers or users.

Figure 1:
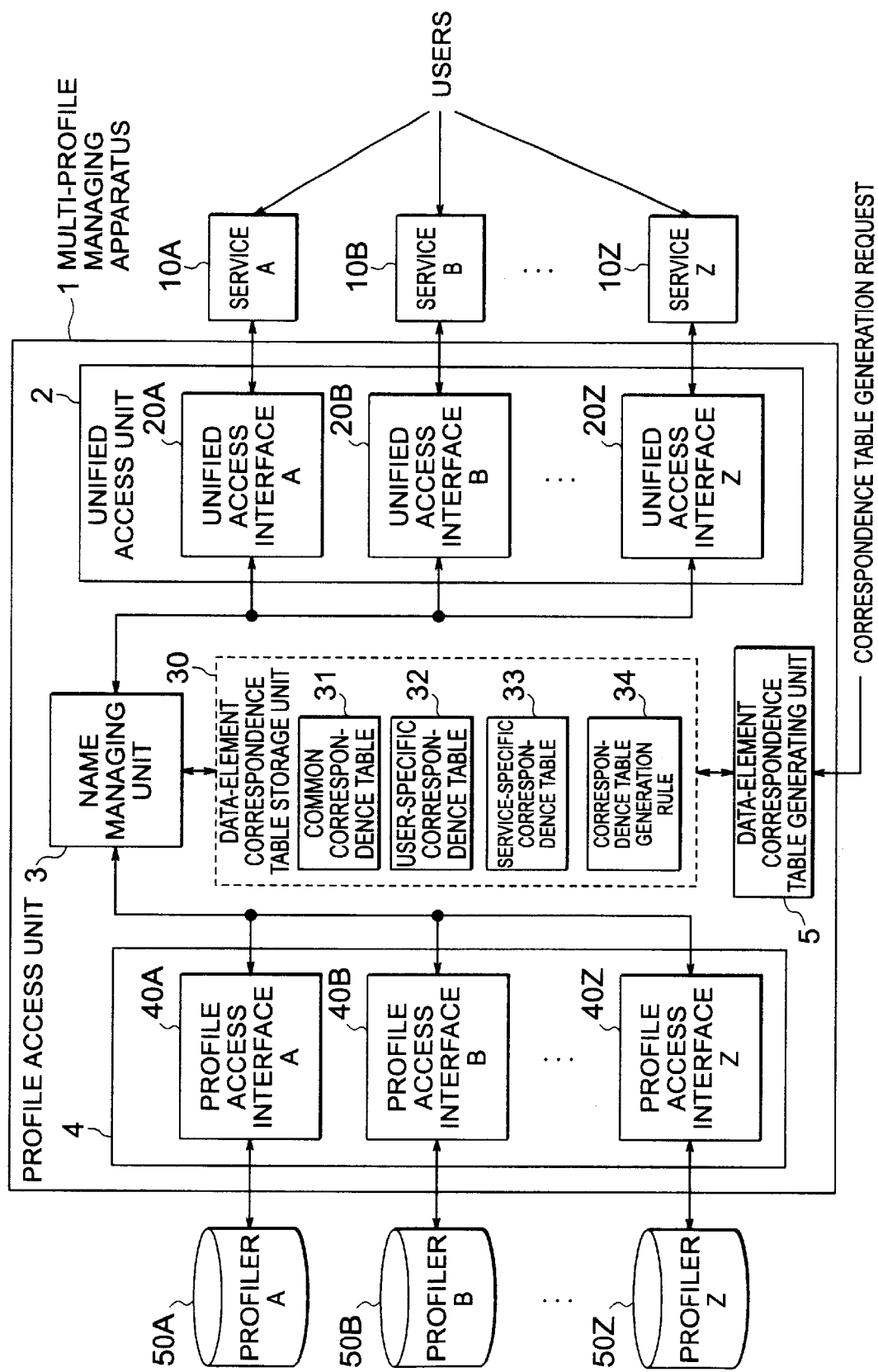
FIG. 1 is a block diagram showing the configuration of an apparatus according to the present invention.

FIG. 1 is a block diagram showing the configuration of an apparatus according to the present invention. A multi-profile managing apparatus 1 includes a unified access unit 2, a name managing unit 3, a data-element correspondence table storage unit 30, a profile access unit 4, and a data-element correspondence table generating unit 5.

The profile access unit 4 includes a plurality of profile access interfaces 40, each being provided for one of different access protocols of profilers 50. Each profile access interface 40 provides the name managing unit 3 with an interface for a single type of profile access. For example, a profile access interface 40A is provided for a profiler 50A. Similarly, a profile access interface 40B is provided for a profiler 50B, and a profile access interface 40Z is provided for a profiler 50Z. Each of the profile access interfaces 40A to 40Z can be built in as an independent module. Therefor, for connection with a profiler 50X of a new type, a profile access interface 40X corresponding to an access protocol for the profiler 50X can be built in through a simple operation.

The unified access unit 2 provides a plurality of unified access interfaces 20. Each unified access interface 20 interprets a protocol which a corresponding service 10 follows in order to utilize a profiler 50; translates a request for addition, deletion, reference, or update of a data element in the profiler 50; and transmits to the name managing unit 3 the request received from the service 10.

When a certain service 10 and a certain profiler 50 are operated through use of a specific protocol, the unified access interface 20 is usefully used to add a multi-profile managing function, without changing the implementation of the service 10 and the profiler 50.

The name managing unit 3 receives a profile access request from a certain service 10 via the corresponding unified access interface 20 of the unified access unit 2. Subsequently, while referring to the data-element correspondence table storage unit 30, the name managing unit 3 obtains paired data composed of a physical profiler name (physical address of a profiler) and a real data element name from a virtual data element name contained in a parameter of the request to thereby convert the virtual data element name to the paired data. Subsequently, the name managing unit 3 transfers the profile access request to the corresponding profile access interface 40 of the profile access unit 4.

The data-element correspondence table storage unit 30 stores a plurality of correspondence tables. Each correspondence table stores the correspondence between each virtual data element name, and paired data composed of a corresponding physical profiler name and a corresponding real data element name. In the example shown in FIG. 1, the data-element correspondence table storage unit 30 includes a common correspondence table 31 used in common among all of services and users, a user-specific correspondence table 32 customized for each user, and a service-specific correspondence table 33 managing for each service. Although the user-specific correspondence table 32, the service-specific correspondence table 33, and the common correspondence table 31 are referred to in this order of priority, the present invention can be practiced properly so long as at least one of these tables is provided.

Figure 2:
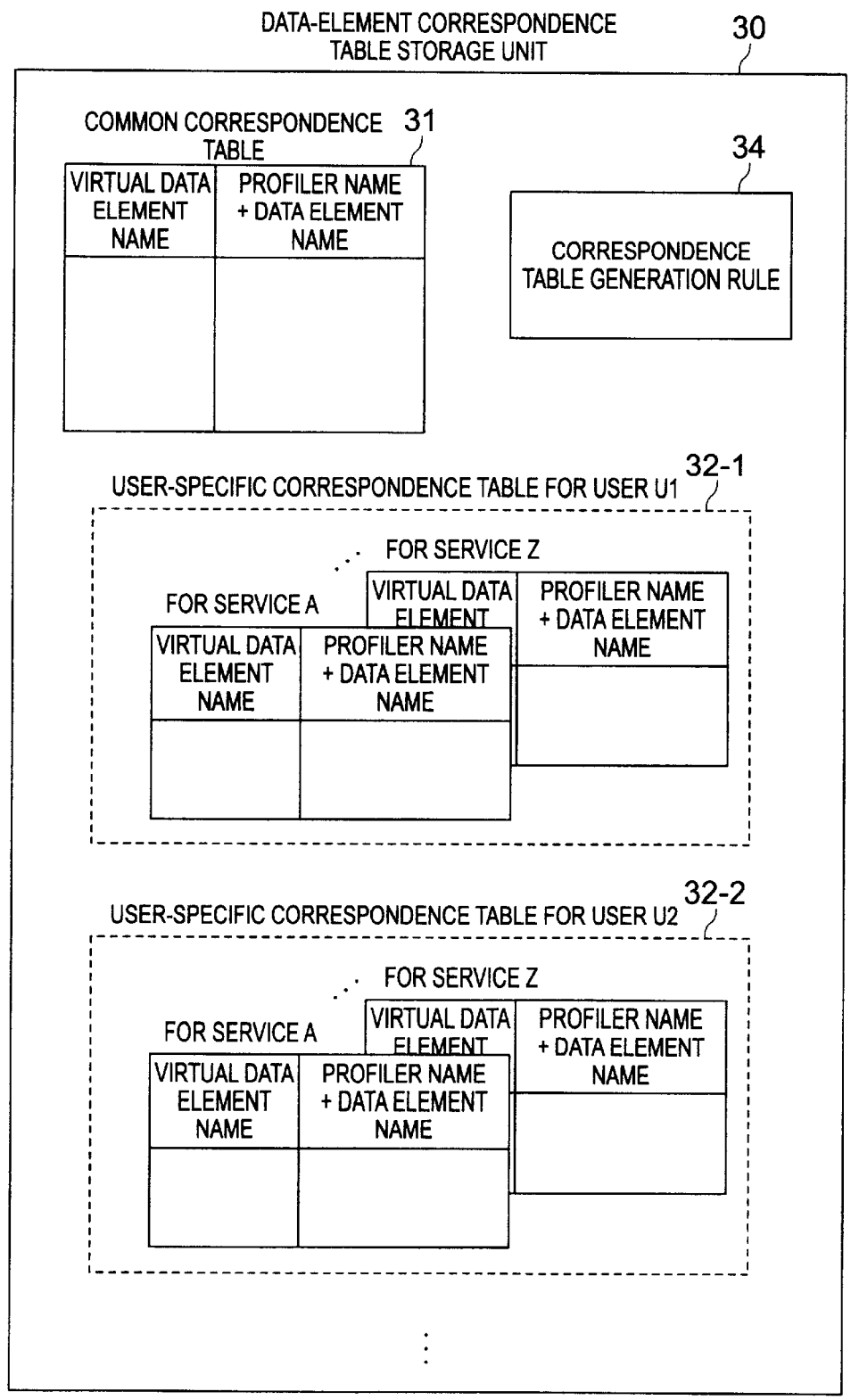
FIG. 2 is a diagram showing an exemplary configuration of a data-element correspondence table storage unit.

Notably, there may be employed a table configuration such that some of these correspondence tables are combined hierarchically. In the example shown in FIG. 2, in addition to the common correspondence table 31 used in common among all services and users, user-specific correspondence tables 32-1, 32-2, etc. are provided for the respective users; and each user-specific correspondence table holds, for each service, data representing the correspondence between each virtual data element name, and paired data composed of a corresponding profiler name and a corresponding data element name.

The above-described embodiment may be modified such that the above-mentioned correspondence tables are held not within the multi-profile managing apparatus 1 but in an external storage device or an external server.

Further, a correspondence-table generation rule 34 may be stored in the data-element correspondence table storage unit 30. The correspondence-table generation rule 34 automatically generates a correspondence table or modifies an existing correspondence table whenever a new profiler 50 is created or an existing profiler 50 is updated. In accordance with an instruction from a system manger, a user, or a service provider, the data-element correspondence table generating unit 5 creates or modifies the common correspondence table 31, the user-specific correspondence table 32, or the service-specific correspondence table 33 by use of the correspondence-table generation rule 34 if necessary.

The apparatus shown in FIG. 1 operates as follows. When the name managing unit 3 receives from a unified access interface 20 of the unified access unit 2 a request for addition, deletion, reference, or update in relation to a data element, the name managing unit 3 checks whether the parameter of the request contains a physical profiler name (physical address of a profiler). When a physical profiler name is contained in the request, the name managing unit 3 transmits the request for addition, deletion, reference, or update to the corresponding profile access interface 40 of the profile access unit 4.

When no physical profiler name is contained in the request, the name managing unit 3 acquires a user name and a service name from the request data (transmission-source address, authentication data, etc.), and then checks whether a data-element corresponding table (user-specific correspondence table 32 or service-specific correspondence table 33) corresponding to the user name and the service name is present in the data-element correspondence table storage unit 30. When no corresponding table is present, or when a designated virtual data element name cannot be searched in the corresponding table, the name managing unit 3 searches the common correspondence table 31, while using the virtual data element name as a key, to thereby obtain a profiler name and a real data element name.

After obtainment of the profiler name and the real data element name, the name managing unit 3 transmits to a profile access interface 40 of the profile access unit 4 corresponding to the profiler 50 a request for addition, deletion, reference, or update in relation to the obtained real data element name. Subsequently, the name managing unit 3 awaits a request result. Upon receipt of the request result, the name managing unit 3 transfers the result to the unified access unit 2.

Next, the embodiment of the present invention will be described in further detail by way of specific examples. Services utilize various profilers, ranging from a profiler having an implementation dedicated for each service to a profiler using a standard protocol. Examples of standard protocols include LDAP (Lightweight Directory Access Protocol), which is known as a directory server; and SQL (Structured Query Language) and ODBC (Open Database Connectivity), which are employed by many data bases. Many web services independently provide profile access by means of HTTP protocol.

In the example described below, the unified access interface 20B of the unified access unit 2 is implemented HTTP therein, and the profile access interface 40B of the profile access unit 4 is implemented SQL therein. The service 10B accesses profile data stored in a data base via the unified access interface 20B, the name managing unit 3, and the profile access interface 40B.

The unified access interface 20B of the unified access unit 2 receives a HTTP request of, for example, the following format:

http://host/UserProfile/?uid=28539&command=read&name=a

Since uid=28539 represents a user name, command=read represents a reference request, and name=a represents that a virtual data element name is "a," the unified access interface 20B extracts the following information from the HTTP request.

{command: reference, name:"a", user:"28539"}

The name managing unit 3 stores in the data-element correspondence table storage unit 30 data representing the correspondence between the paired data composed of a physical address of the profiler 50B and a real name of a data element within the profiler, and a virtual data element name used in the multi-profile managing apparatus 1, in the form of the common correspondence table 31, the user-specific correspondence table 32, or the service-specific correspondence table 33.

The name managing unit 3 refers to the correspondence table in the data-element correspondence table storage unit 30 while using the virtual data element name [name:"a"] as a key to thereby obtain the physical address [P1] of the profiler 50B, and converts the above extracted information to the following information:

{command: reference, profile:"P1", name:"a", user:"28539"}

The "P1" obtained from the correspondence table represents a physical profiler name, by which the corresponding profile access interface 40B of the profile access interface 4 is selected.

Here, it is assumed that the selected profile access interface 40B is realized data base access of SQL commands as follows, using a Java language:

connection=DriverManager.getConnection("jdbc:odbc://host/profile",null, null);

statement=connection.prepareStatement("SELECT ? FROM ? WHERE USER=?");

statement.setString(1,"a");

statement.setString(2,"P1");

statement.setString(3,"28539");

result=statement.executeQuery( );

return result.getString("a");

By virtue of this program, on the basis of the information obtained from the name managing unit 3, the profile access interface 40B obtains the data element "a" of the user "28539" stored in the data base "P1."

Example Conversion in Name Managing Unit (Ex. 1)

Figure 3:
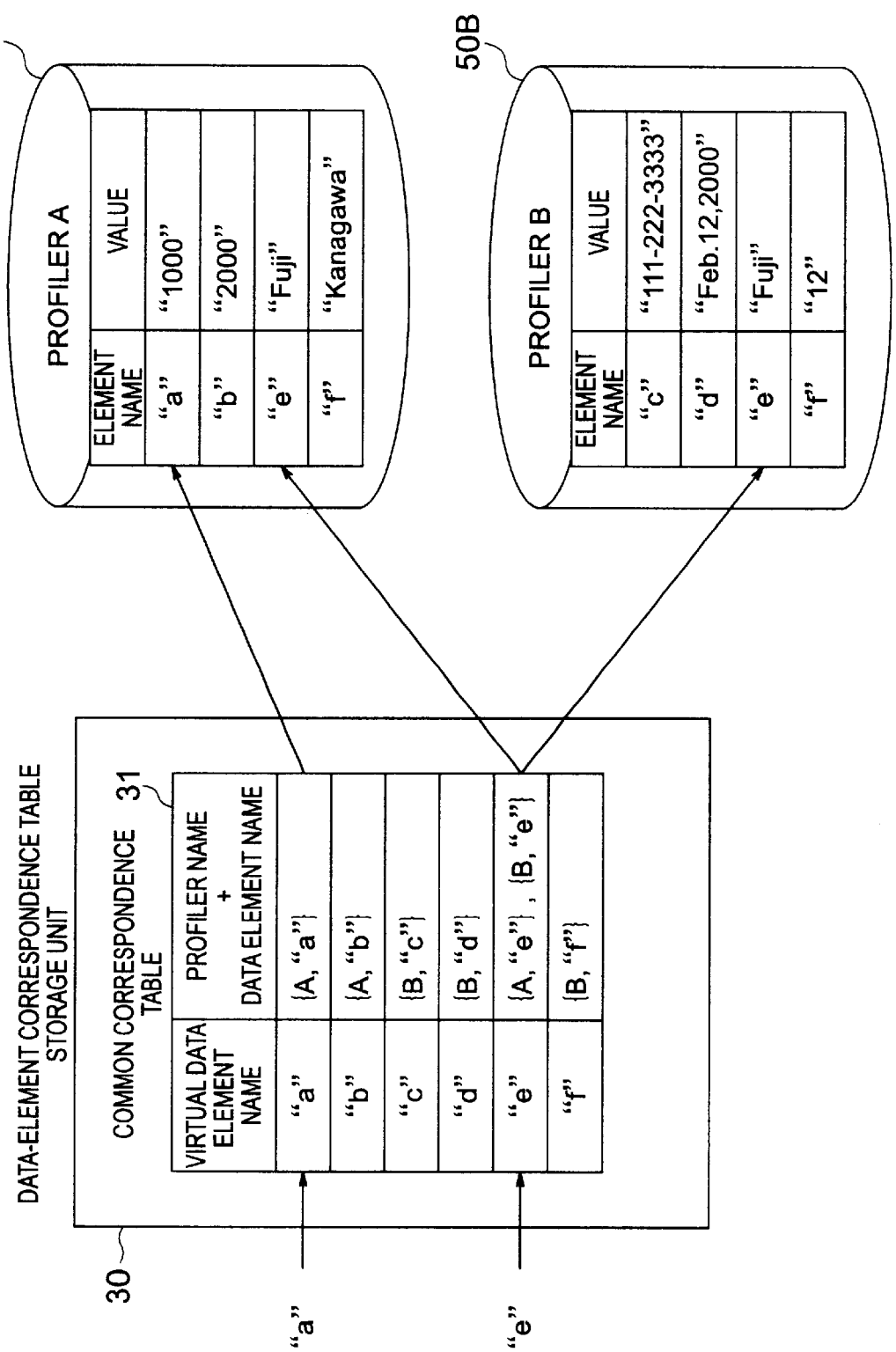
FIG. 3 is a diagram showing a specific example of tables of the data-element correspondence table storage unit.

FIG. 3 shows an example of the tables stored in the data-element correspondence table storage unit 30 of the multi-profile managing apparatus 1 for the case in which the profiler 50A contains element names "a," "b," "e," and "f"; and profiler 50B contains element names "c," "d," "e," and "f." In this example, only the common correspondence table 31 is present, and the user-specific correspondence table 32 and the service-specific correspondence table 33 are not present.

When a certain service requests the multi-profile managing apparatus 1 to provide the value of the element name "a," data {A, "a"} corresponding to the element name "a" are obtained in the name managing unit 3. Thus, the requester service can obtain "1000"—which is the value of the data element—from the profiler 50 by designating only the element name "a" without designation of the profiler 50A.

When a certain service requests the multi-profile managing apparatus 1 to change the value of the element name "e" to "Toshi," data {A, "e"} and {B, "e"} are obtained in the name managing unit 3 as corresponding data. Therefore, both the values of the date element "e" in the profiler 50A and the data element "e" in the profiler 50B are changed from "Fuji" to "Toshi." In practice, in order to reliably perform simultaneous re-writing of data at a plurality of locations, the name managing unit 3 must have a well-known transaction function.

Example of Correspondence Table Generation Rule

The correspondence-table generation rule 34 for automatically generating a correspondence table to be stored in the data-element correspondence table storage unit 30 contains the following definition.

rule1=synchronizing data elements of the same value rule2=synchronizing data elements of the same name rule3=exception: "f" → {B, "f"}

In the definition, the term "synchronizing" means treating data elements present in a plurality of profilers as a single data element, such that when one of the data elements is updated the remaining related data elements are updated in the same manner.

By virtue of the rule definition, the data-element correspondence table generating unit 5 can generate, for example, the common correspondence table 31 shown in FIG. 3 while checking the contents of the profilers 50A and 50B. The correspondence-table generation rule 34 may be provided for each of the common correspondence table 31, the user-specific correspondence table 32, or the service-specific correspondence table 33.

Example Conversion in Name Managing Unit (Ex. 2)

Figure 4:
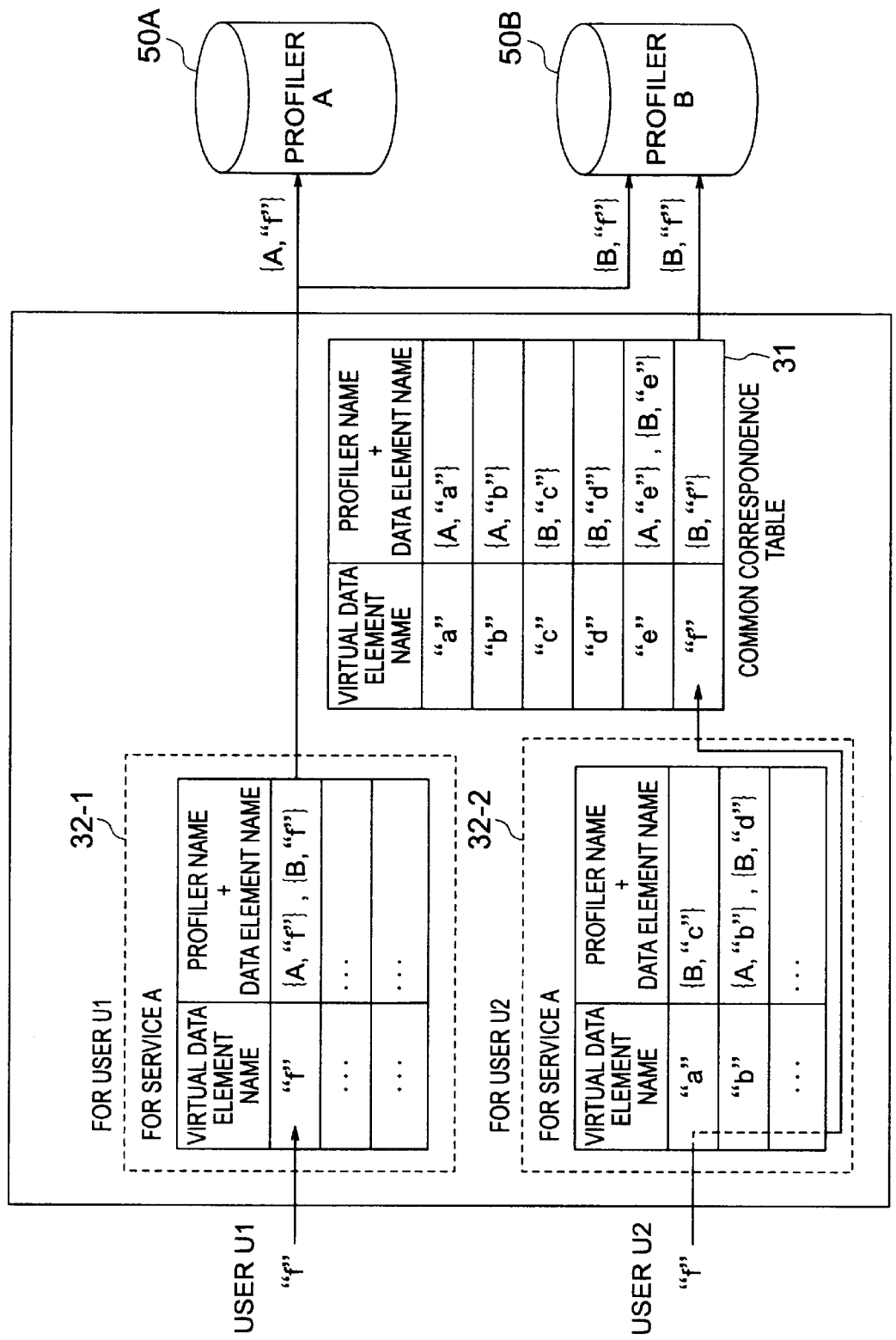
FIG. 4 is a diagram showing a specific example of the tables of the data-element correspondence table storage unit.

FIG. 4 shows an example of use of the tables stored in the data-element correspondence table storage unit 30 in which a user-specific correspondence table is provided for each user or a service-specific correspondence table is provided for each service in order to store the correspondence between each data element name and a data element in a profiler, thereby enabling customization. This example is directed to the case in which users U1 and U2 try to refer to a data element name "f" by use of the service 10A.

When any user-specific correspondence table 32 is present, the name managing unit 3 uses the user-specific correspondence table 32, in preference to the common correspondence table 33, for mapping of the data element name. Accordingly, in response to the request from user U1 designating the data element name "f," the data element name "f" is converted to {A, "f"} and {B, "f"} with reference to the user-specific correspondence table 32-1 for user U1. The request from user U1 for referring to the data element "f" results in reference to both the data element "f" in the profiler 50A and the data element "f" in the profiler 50B. In the case of an update request, these two data elements are synchronously updated at all times.

In contrast, the request from the user U2 for accessing the data element "f" is handled in a manner differing from the above-described case. Since mapping for the data element "f" is not entered in the user-specific correspondence table 32-2 for user U2, the data element "f" designated by the parameter of the request is mapped to reference of the data element "f" in the profiler 50B with reference to the common correspondence table 31, which are used in common among users and services. Thus, the data element "f" in the profiler 50B is handled independently of the data element "f" in the profiler 50A.

A specific case in which one-to-many mapping is performed as in the case of the user U1 is the case in which a user wants to simultaneously manage his/her phone number stored in an LDAP server and a data base.

In the example of FIG. 4, the tables are customized such that for user U2, a data element "a" and a data element name "c" are both mapped to a data element "c" of the profiler 50B. A specific case in which such many-to-one mapping is performed is the case in which the user U2 has two mail addresses and wants to manage, by use of a single mail box, mails which are addressed to either one of these two mail addresses.

Figure 5:
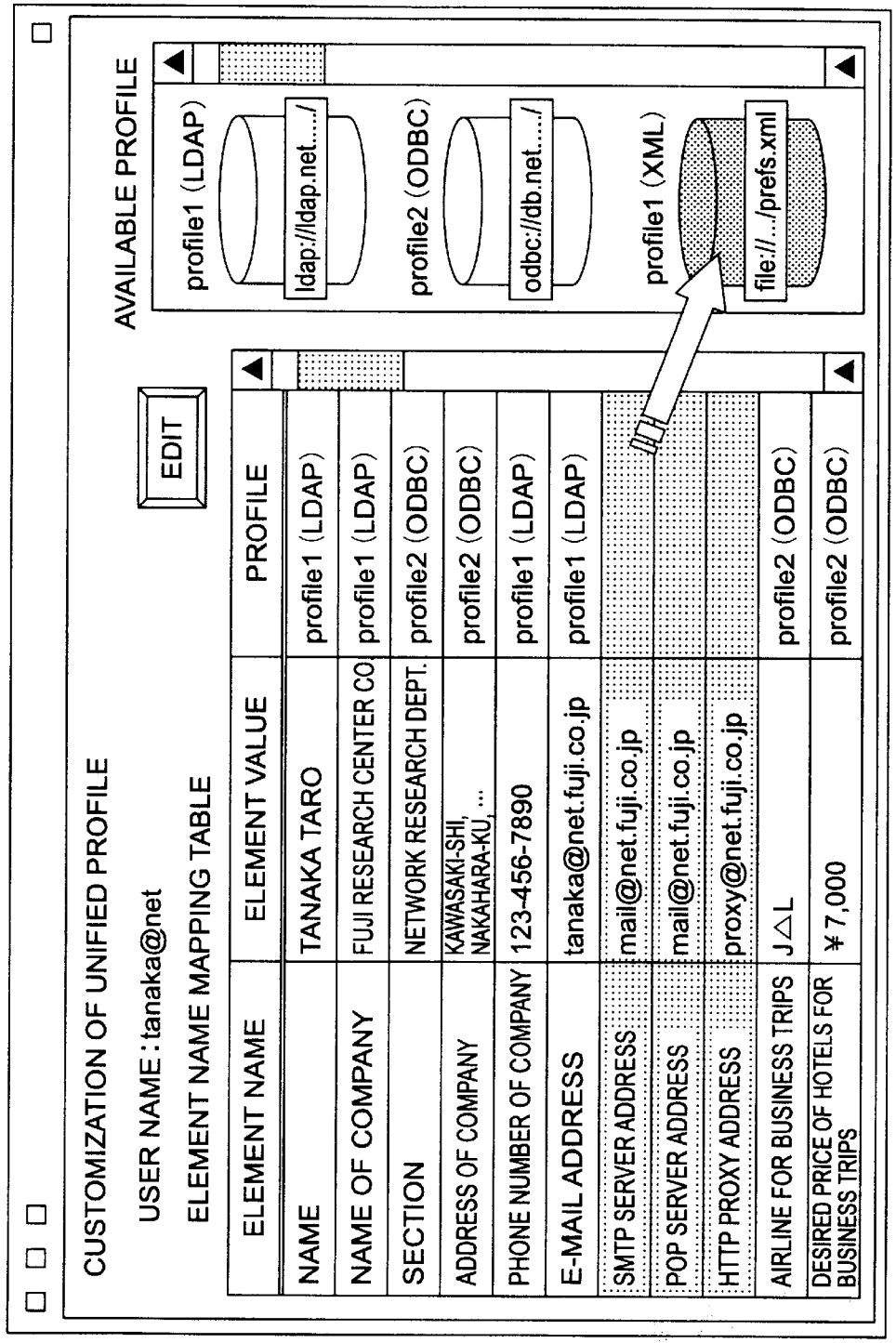
FIG. 5 is a diagram showing an exemplary display screen used for customization of a unified profile.

FIG. 5 shows an exemplary display screen used for customization of a unified profile. When a certain element name is to be mapped to a physical profile (i.e., a correspondence is to be established between the certain element name and the physical profile), an operation as shown in the exemplary display screen of FIG. 5 is performed. Specifically, a user selects one or a plurality of lines of elements to be modified from an element name mapping table and drags and drops the selected line(s) to one of icons which are disposed on the right side of the screen and represent available profiles. When this operation is performed in a state in which linkage to one or more profiles is already present, mapping to the plurality of profiles is added. When the mapping of an element to a profile is to be changed, the user selects the element to be changed, and then clicks an edit button to display an edit dialog. Subsequently, the user performs necessary operation on the edit dialog. When an element name or an element value is to be changed, the user also performs necessary operation on the edit dialog.

Figure 6:
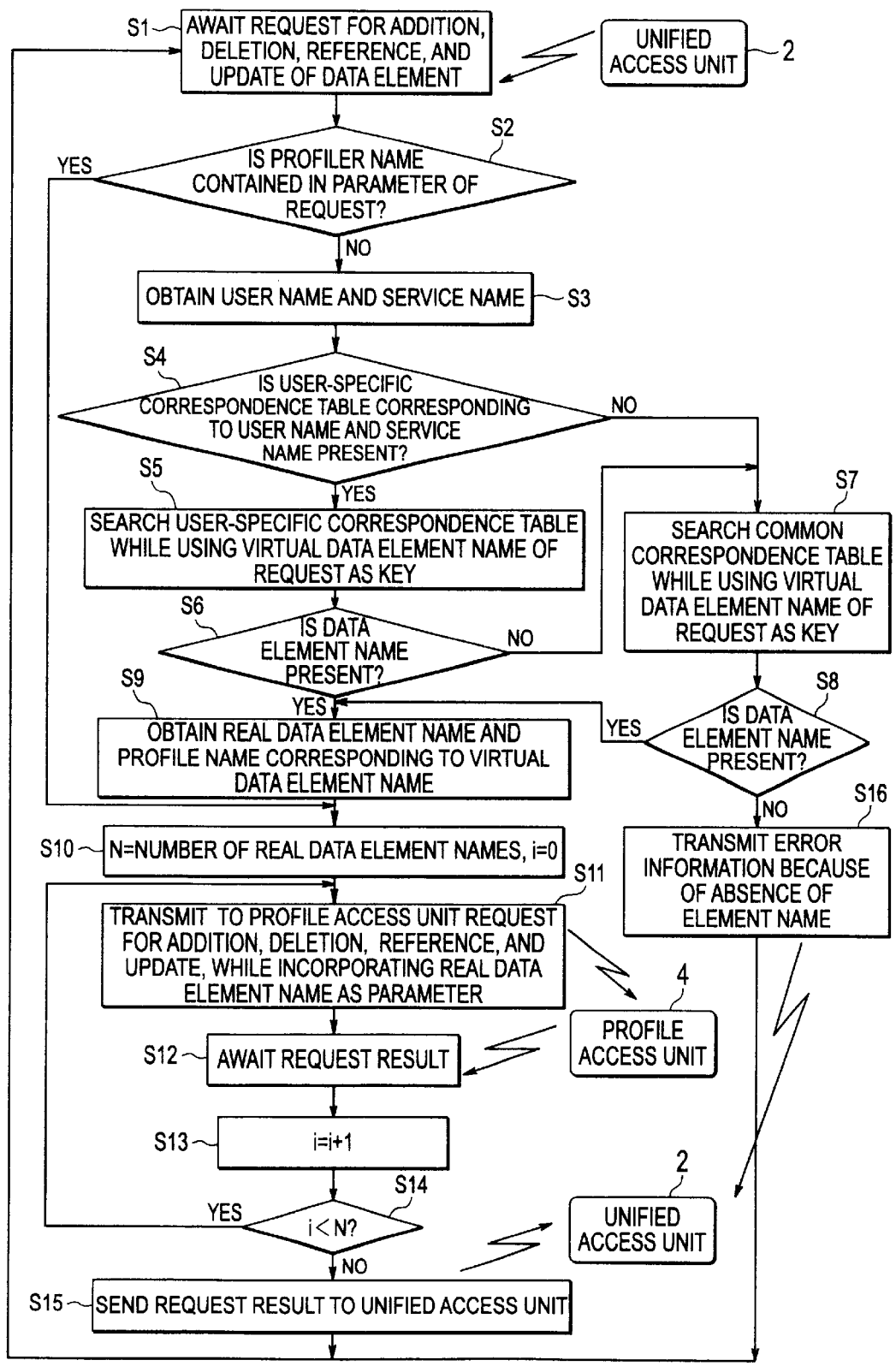
FIG. 6 is a flowchart showing processing performed in a name managing unit.

FIG. 6 shows the flow of processing performed in the name managing unit 3. The name managing unit 3 awaits a request for addition, deletion, reference, or update of a data element which is output from the unified access unit 2 (step S1). Upon receipt of the request, the name managing unit 3 checks whether the parameter of the request contains a physical profiler name (physical address of a profiler) (step S2). When a physical profiler name is contained in the request, the name managing unit 3 proceeds to step S10.

When no physical profiler name is contained in the request, the name managing unit 3 acquires a user name and a service name from the request data (transmission-source address, authentication data, etc.) (step S3), and then checks whether a user-specific correspondence table 32 (or a service-specific correspondence table 33) corresponding to the user name and the service name is present in the data-element correspondence table storage unit 30 (step S4). When a corresponding table is present, the unified access interface 3 searches the user-specific correspondence table 32 while using the virtual data element name of the request as a key (step S5). When the search result indicates that the user-specific correspondence table 32 contains a corresponding virtual data element name (step S6), the name managing unit 3 proceeds to step S9.

When no corresponding user-specific correspondence table 32 is present (step S4) or when no corresponding virtual data element name is present in the corresponding user-specific correspondence table 32 (step S6), the name managing unit 3 searches the common correspondence table 31, while using the virtual data element name as a key (step S7). When the search result indicates that the common correspondence table 31 contains a corresponding virtual data element name (step S8), the name managing unit 3 proceeds to step S9. When the common correspondence table 31 does not contain any corresponding virtual data element name, the name managing unit 3 transmits error information to the unified access unit 2, to thereby indicate absence of a corresponding element name (step 16).

The name managing unit 3 obtains a profiler name and a real data element name from the user-specific correspondence table 32 or the common correspondence table 31 (step S9) and then proceeds to step S10.

In step S10, the name managing unit 3 performs setting processing such that N=the number of real data element names and i=0. Subsequently, the name managing unit 3 transmits to a profile access interface 40 of the profile access unit 4 corresponding to the profiler name a request for addition, deletion, reference, or update, while incorporating a real data element name as a parameter (step S11). Subsequently, the name managing unit 3 awaits a request result (step S12). Upon receipt of the request result, the name managing unit 3 increments i by 1 (step S13). The name managing unit 3 repeats the processing in steps S11 to S13 until i reaches N; i.e., the number of real data element names (step S14). Subsequently, the name managing unit 3 transfers the request result back to the unified access unit 2 (step S15). After completion of the above-described processing, the name managing unit 3 returns to step S1 and awaits the next request.

Figure 7:
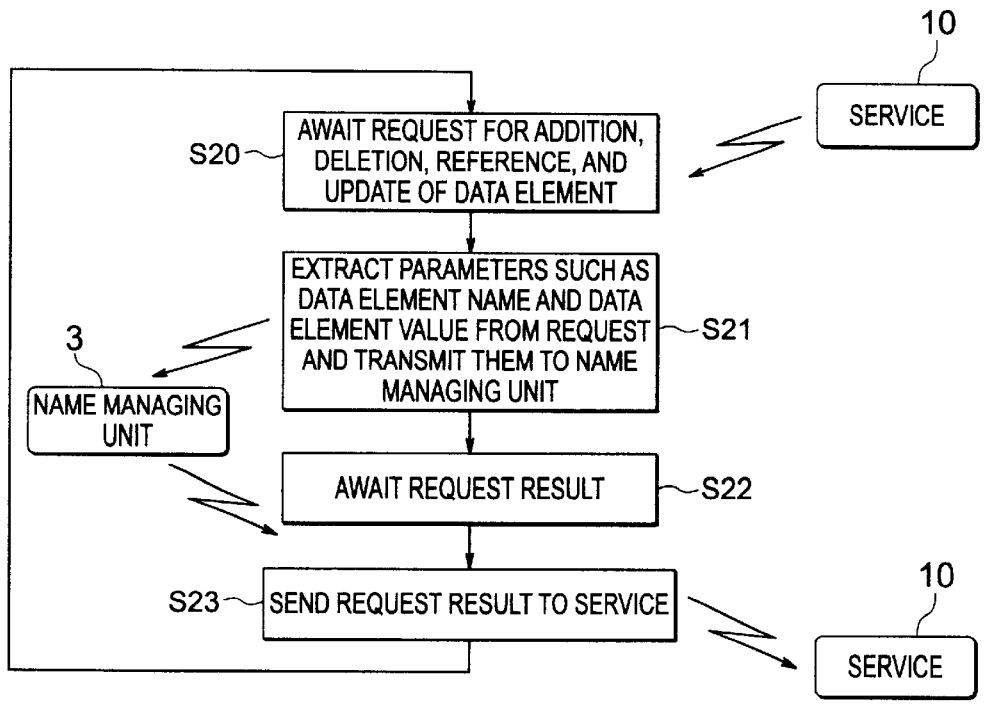
FIG. 7 is a flowchart showing processing performed in a unified access unit.

FIG. 7 shows the flow of processing performed in the unified access unit 2. The unified access unit 2 awaits a request for addition, deletion, reference, or update of a data element which is output from a certain service 10 (step S20). Upon receipt of the request, the unified access unit 2 extracts parameters, such as a data element name and a data element value, from the request and transmits them to the name managing unit 3 (step S21). Subsequently, the unified access unit 2 awaits a request result from the name managing unit 3 (step S22). Upon receipt of the request result, the unified access unit 2 returns the request result to the corresponding service 10 (step S23).

Figure 8:
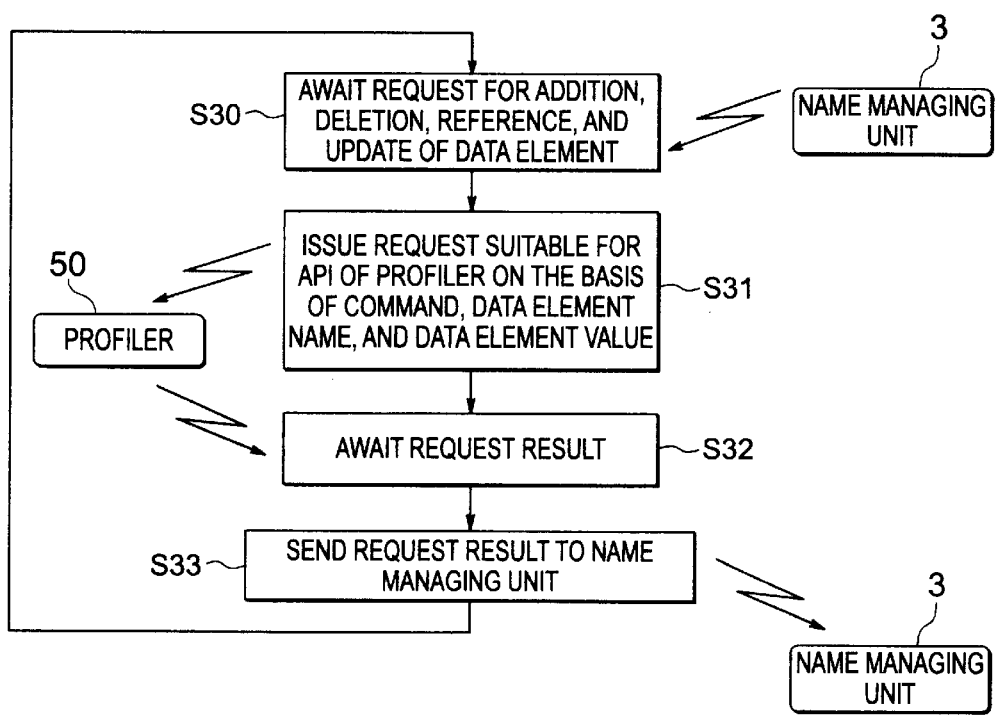
FIG. 8 is a flowchart showing processing performed in a profile access unit.
Figure 9:
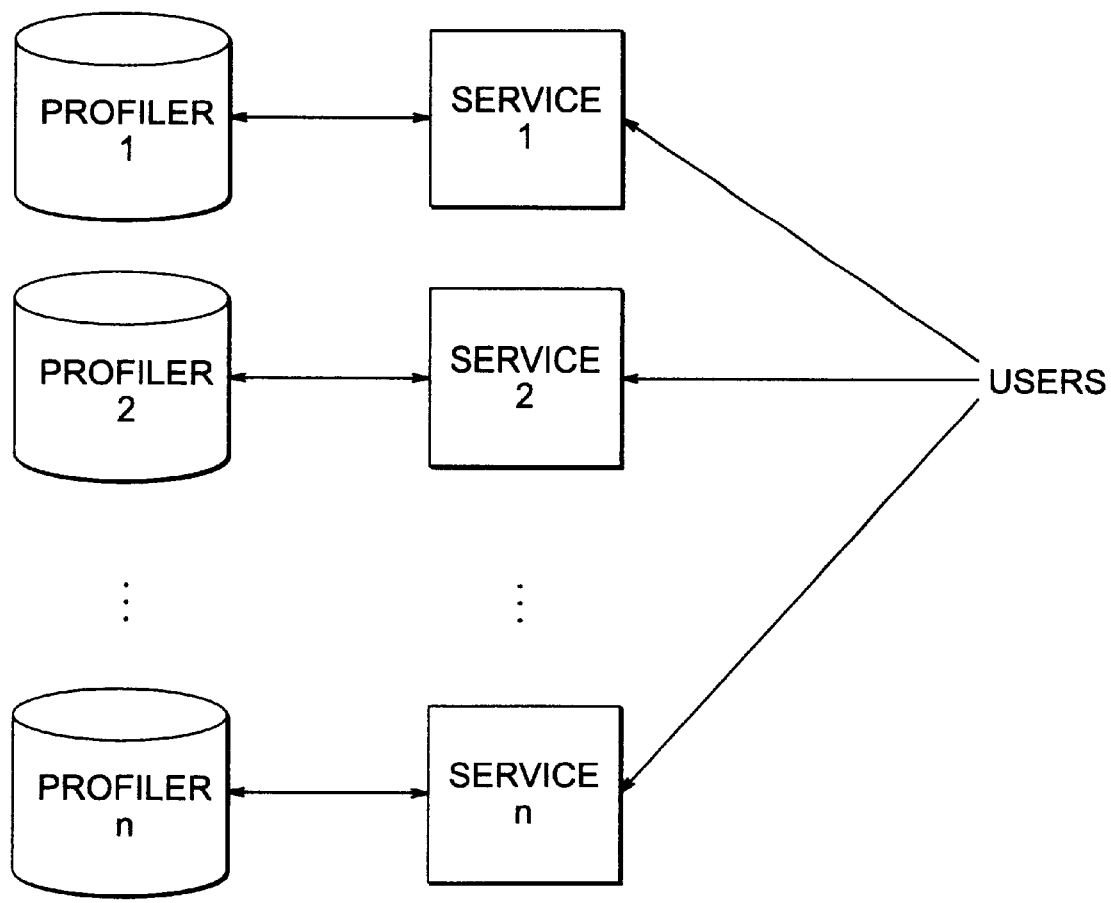
FIG. 9 is an explanatory diagram showing the conventional art.

FIG. 8 shows the flow of showing processing performed in the profile access unit 4. The profile access unit 4 awaits a request for addition, deletion, reference, or update of a data element which is output from the name managing unit 3 (step S30). Upon receipt of the request, the profile access unit 4 issues a request suitable for API (Application Programming Interface) of the profiler 50 on the basis of a command, the data element name, and the data element value (step S31). Subsequently, the profile access unit 4 awaits a request result from the profiler 50 (step S32). Upon receipt of the request result, the profile access unit 4 returns the request result to the name managing unit 3 (step S33).

As described above, the multi-profile managing apparatus 1 unifies the interfaces of deferent types of profilers and manages the names of data elements, to thereby provides a single virtual, unified profiler. The deferent types of profilers include a plurality of profilers differing from one another in terms of at least one of access protocol, data expression scheme and data element names, for example. In particular, separate provision of the profile access interfaces 40 which perform inquiry to different type of profilers enables easy connection of a profiler of a new type.

Further, the name managing unit 3 manages data-element correspondence tables each storing a correspondence between a virtual data element name used in the multi-profile managing function, and paired data composed of a physical address of a profiler and a real name of a corresponding data element within the profiler. Thus, it becomes possible to access target data by designating only the virtual data element name and without designation of the physical address of the profiler.

Further, the name managing unit 3 permits a single virtual data element name to correspond (or be linked) to a plurality of paired data sets each composed of a physical address of a profiler and a real name of a corresponding data element within the profiler. Therefore, when an update request having such a data element name is generated, the plurality of corresponding data elements can be updated simultaneously or synchronously.

In the multi-profile managing apparatus 1, the correspondence-table generation rule 34 is provided, and the data-element correspondence table generating unit 5 has a function of evaluating the correspondence-table generation rule 34. Thus, it becomes possible to automatically rewrite the data element corresponding tables whenever a new profiler is connected to the multi-profile managing apparatus 1 or a new data element is added.

In the multi-profile managing apparatus 1, the correspondence tables in the data-element correspondence table storage unit 30 are divided into those for common use and those for users, and a user is allowed to change the contents of the correspondence tables for users. Thus, the correspondence relationships of data elements can be customized for each of users who access the profiles.

Similarly, in the multi-profile managing apparatus 1, the correspondence tables in the data-element correspondence table storage unit 30 can be divided into those for common use and those for services. In this case, different correspondence relationships of data elements can be set for respective services which utilize the multi-profile managing function.

As to hardware, the multi-profile managing apparatus 1 is realized by a computer which includes one or more CPUs (Central Processing Units), a main storage device, an external storage device such as a hard-disk drive, and a bus connecting them. A software program which causes the computer to function as the multi-profile managing apparatus 1 can be stored in or on a proper computer-readable recording medium such as a transportable memory medium, a semiconductor memory, or a hard-disk drive.

As described above, through application of the present invention, even when profilers utilized by various services are operated independently of one another, the profilers can be handled as a single virtual profiler, and data of repeated contents can be handled in a synchronized manner through single-time access.

Moreover, through provision of the unified access unit, the same access protocols as those used by existing services can be used. Therefore, each service can access the unified profiler by use of a conventional protocol, whereby the influence on the existing services is minimized. Such profile sharing greatly mitigates the burdens which are imposed on both service providers and users upon addition of a new service.

The many features and advantages of the invention are apparent from the detailed specification and, thus, the appended claims are intended to cover all such features and advantages of the invention which fall within the true spirit and scope of the invention. Further, since numerous modifications and changes will readily occur to those skilled in the art, it is not intended that the invention be limited to the exact construction and operation illustrated and described, and accordingly all suitable modifications and equivalents may be resorted to, so long as they fall within the scope of the invention.

What is claimed is:

1. A multi-profile managing apparatus being connected a plurality of profilers which are a different type from one another in terms of at least one of access protocol, data expression scheme, and data element names, each profiler including at least a real name of a data element existing in a real storage location, the apparatus comprising:

a unified access unit accepting an access request originating from a user to any of the plurality of profilers according to an access protocol determined for each of a plurality of services, the access request designating a data element name that is associated with the user;

a name managing unit converting the data element name designated in the access request to information indicating a real storage location corresponding to the data element name;

a profile access unit accessing the profiler on the basis of the information indicating the real storage location obtained by the name managing unit; and a data-element correspondence table holding correspondence data representing the correspondence between each data element name used in the plurality of services, and at least one paired data composed of a physical address of a profiler and a real name of a data element;

wherein the name managing unit specifies the real storage location corresponding to the data element name designated in the access request on the basis of the physical address and the real name of the data element obtained from the data-element correspondence table by using the data element name, and wherein the user accesses different profilers through the multi-profile managing apparatus by issuing different access requests, each of which includes a different data element name, to the multi-profile managing apparatus.

2. A multi-profile managing apparatus according to claim 1, wherein the profile access unit comprises a plurality of profile access interfaces to access the plurality of profilers, and is configured such that a new profile access interface can be added to cope with connection of a profiler of a new type.

3. A multi-profile managing apparatus being connected a plurality of profilers which are a different type from one another in terms of at least one of access protocol, data expression scheme, and data element names, each profiler including at least a real name of a data element existing in a real storage location, the apparatus comprising:

a unified access unit accepting an access request originating from a user to any of the plurality of profilers according to an access protocol determined for each of a plurality of services, the access request designatinq a data element name that is associated with the user;

a name managing unit converting the data element name designated in the access request to information indicating a real storage location corresponding to the data element name;

a profile access unit accessing the profiler on the basis of the information indicating the real storage location obtained by the name managing unit; and a data-element correspondence table holding correspondence data representing the correspondence between each data element name used in the plurality of services, and at least one paired data composed of a physical address of a profiler and a real name of a data element;

wherein the name managing unit specifies the real storage location corresponding to the data element name designated in the access request on the basis of the physical address and the real name of the data element obtained from the data-element correspondence table by using the data element name, and wherein the data-element correspondence data storage unit is configured such that a single data element name of a profiler used by services is made to correspond to a plurality of paired data sets each composed of a physical address of a profiler and a real name of the data element within the profiler; and wherein, when an update request that designates the single data element name is generated, the name managing unit and the profile access unit update the plurality of corresponding data elements in a synchronized manner.

4. A multi-profile managing apparatus being connected a plurality of profilers which are a different type from one another in terms of at least one of access protocol, data expression scheme, and data element names, each profiler including at least a real name of a data element existing in a real storage location, the apparatus comprising:

a unified access unit accepting an access request originating from a user to any of the plurality of profilers according to an access protocol determined for each of a plurality of services, the access request designating a data element name that is associated with the user;

a name managing unit converting the data element name designated in the access request to information indicating a real storage location corresponding to the data element name;

a profile access unit accessing the profiler on the basis of the information indicating the real storage location obtained by the name managing unit; and a data-element correspondence table holding correspondence data representing the correspondence between each data element name used in the plurality of services, and at least one paired data composed of a physical address of a profiler and a real name of a data element;

wherein the name managing unit specifies the real storage location corresponding to the data element name designated in the access request on the basis of the physical address and the real name of the data element obtained from the data-element correspondence table by using the data element name, and wherein the data-element correspondence data storage unit stores a common table and specific tables, the common table storing correspondence data to be commonly applied to all users, and the specific tables storing correspondence data sets to be applied independently to at least respective users or respective services; and wherein the name managing unit uses the specific tables in preference to the common table.

5. A multi-profile managing apparatus being connected a plurality of profilers which are a different type from one another in terms of at least one of access protocol, data expression scheme, and data element names, each profiler including at least a real name of a data element existing in a real storage location, the apparatus comprising:
- a unified access unit accepting an access request originating from a user to any of the plurality of profilers according to an access protocol determined for each of a plurality of services, the access request designating a data element name that is associated with the user;
- a name managing unit converting the data element name designated in the access request to information indicating a real storage location corresponding to the data element name;
- a profile access unit accessing the profiler on the basis of the information indicating the real storage location obtained by the name managing unit;
- a data-element correspondence table holding correspondence data representing the correspondence between each data element name used in the plurality of services, and at least one paired data composed of a physical address of a profiler and a real name of a data element; and
- a data-element correspondence table generating unit generating correspondence data to be stored in the data-element correspondence data storage unit in accordance with a correspondence data generation rule previously input, whenever a new profiler is connected or a new data element is added to an existing profiler,
- wherein the name managing unit specifies the real storage location corresponding to the data element name designated in the access request on the basis of the physical address and the real name of the data element obtained from the data-element correspondence table by using the data element name.

6. A multi-profile managing apparatus according to claim 5, further comprising:
- a correspondence-table generation rule generating the data-element corresponding table.

7. A multi-profile managing method for managing a plurality of profilers which are a different type from one another in terms of at least one of access protocol, data expression scheme, and data element names, each profiler including at least a real name of a data element existing in a real storage location, the method comprising:
- accepting an access request to a profiler originating from a user of any of services by a unified access interface corresponding to an access protocol determined for the services, the access request designating a data element name that is associated with the user;
- holding correspondence data representing the correspondence between each data element name used in the plurality of services and at least one paired data composed of a physical address of a profiler and a real name of a data element;
- converting the data element name designated in the access request to information indicating the real storage location on the basis of the physical address and the real name of the data element obtained from the correspondence data by using the data element name; and
- accessing the corresponding profiler on the basis of the information indicating the real storage location obtained through the conversion, by use of an profile access interface corresponding to the access protocol to the profiler,
- wherein the user accesses different profilers through the multi-profile managing apparatus by issuing different access requests, each of which includes a different data element name, to the multi-profile managing apparatus.

8. A computer readable medium recording a program to realize a multi-profile managing apparatus being connected a plurality of profilers which are a different type from one another in terms of at least one of access protocol, data expression scheme, and data element names, each profiler including at least a real name of a data element existing in a real storage location, wherein the program causes a computer to perform:
- processing to accept an access request to a profiler originating from a user of any of services in accordance with an access protocol determined for the service, the access request designating a data element name that is associated with the user;
- processing to hold correspondence data representing the correspondence between each data element name used in the plurality of services, and at least one paired data composed of a physical address of a profiler and a real name of a data element;
- processing to convert the data element name designated in the access request to information indicating the real storage location on the basis of the physical address and the real name of the data element obtained from the correspondence data by using the data element name; and
- processing to access the profiler on the basis of the information indicating the real storage location,
- wherein the user accesses different profilers through the multi-profile managing apparatus by issuing different access requests, each of which includes a different data element name, to the multi-profile managing apparatus.

9. A computer system comprising:
- a plurality of profilers which are a different type from one another in terms of at least one of access protocol, data expression scheme, and data element names, each profiler including at least a real name of a data element existing in a real storage location;
- a plurality of services; and
- a multi-profile managing apparatus being provided between the plurality of profilers and the plurality of services;
- wherein the multi-profile managing apparatus further comprises:
  - a unified access unit accepting an access request originating from a user to any of the plurality of profilers according to an access protocol determined for each of a plurality of services, the access request designating a data element name that is associated with the user;
  - a name managing unit converting the data element name designated in the access request to information indicating a real storage location within the profiler;
  - a profile access unit accessing the profiler on the basis of the information indicating the real storage location obtained by the name managing unit; and
  - a data-element correspondence table holding correspondence data representing the correspondence between each data element name used in the plurality of services, and at least one paired data composed of a physical address of a profiler and a real name of a data element;
  - wherein the name managing unit specifies the real storage location corresponding to the data element name designated in the access request on the basis of the physical address and the real name of the data element obtained from the data-element correspondence table by using the data element name, and wherein the user accesses different profilers through the multi-profile managing apparatus by issuing different access requests, each of which includes a different data element name, to the multi-profile managing apparatus.

10. A method for accessing from a plurality of services to a plurality of profilers which are a different type from one another in terms of at least one of access protocol, data expression scheme, and data element names, each profiler including at least a real name of a data element existing in a real storage location, the method comprising:

generating an access request originating from a user to one of the plurality of profilers, the access request designating a data element name that is associated with the user;

holding correspondence data representing the correspondence between each data element name used in the plurality of services, and at least one paired data composed of a physical address of a profiler and a real name of a data element;

converting the data element name designated in the access request to information indicating the real storage location, on the basis of the physical address and the real name of the data element obtained from the correspondence data by using the data element name, the access request being accepted by a unified access interface corresponding to an access protocol determined for the service; and accessing the corresponding profiler on the basis of the information indicating the real storage location obtained through the conversion, by use of an profile access interface corresponding to the access protocol to the profiler, wherein the user accesses different profilers through the multi-profile managing apparatus by issuing different access requests, each of which includes a different data element name, to the multi-profile managing apparatus.

11. A multi-profile managing apparatus being connected a plurality of profilers which are a different type from one another in terms of at least one of access protocol, data expression scheme, and data element names, each profiler including at least a real name of a data element existing in a real storage location, the apparatus comprising:

a unified access unit accepting an access request originating from a user to any of the plurality of profilers according to an access protocol determined for each of a plurality of services, the access request designating a data element name that is associated with the user;

a name managing unit converting the data element name designated in the access request to information indicating a real storage location corresponding to the data element name;

a profile access unit accessing the profiler on the basis of the information indicating the real storage location obtained by the name managing unit; and a data-element correspondence table holding correspondence data representing the correspondence between each data element name used in the plurality of services, and at least one paired data composed of a physical address of a profiler and a real name of a data element;

wherein the name managing unit specifies the real storage location corresponding to the data element name designated in the access request on the basis of the physical address and the real name of the data element obtained from the data-element correspondence table by using the data element name, wherein the data-element correspondence table includes at least a common table that stores correspondence data to be commonly applied to all users.

12. A multi-profile managing apparatus according to claim 11, wherein the data element correspondence table includes a first specific tables, each of which stores the correspondence data set to be applied independently to respective users.

13. A multi-profile managing apparatus according to claim 12, wherein the name managing unit uses the first specific tables in preference to the common table.

14. A multi-profile managing apparatus according to claim 12, wherein the data-element correspondence table includes second specific tables, each of which stores the correspondence data set to be applied independently to respective services, and wherein the name managing unit uses the first and second specific tables in preference to the common table, and the first specific tables in preference to the second specific tables.

15. A multi-profile managing apparatus according to claim 11, wherein the data-element correspondence table includes second specific tables, each of which stores the correspondence data set to be applied independently to respective services.

16. A multi-profile managing apparatus according to claim 15, wherein the name managing unit uses the second specific tables in preference to the common table.

17. A multi-profile managing apparatus being connected a plurality of profilers which are a different type from one another in terms of at least one of access protocol, data expression scheme, and data element names, each profiler including at least a real name of a data element existing in a real storage location, the apparatus comprising:

a unified access unit accepting an access request originating from a user to any of the plurality of profilers according to an access protocol determined for each of a plurality of services, the access request designating a data element name that is associated with the user;

a name managing unit converting the data element name designated in the access request to information indicating a real storage location corresponding to the data element name;

a profile access unit accessing the profiler on the basis of the information indicating the real storage location obtained by the name managing unit; and a data-element correspondence table holding correspondence data representing the correspondence between each data element name used in the plurality of services, and at least one paired data composed of a physical address of a profiler and a real name of a data element;

wherein the name managing unit specifies the real storage location corresponding to the data element name designated in the access request on the basis of the physical address and the real name of the data element obtained from the data-element correspondence table by using the data element name, and wherein the data-element correspondence table includes at least a common table which stores correspondence data to be commonly applied to all users, first specific tables, each of which stores the correspondence data set to be applied independently to respective users, and second specific tables, each of which stores the correspondence data set to be applied independently to respective services, and wherein the correspondence-table generation rule is provided for each of the common table, first specific tables and second specific tables.

* * * * *